US009511487B2

(12) United States Patent
Chen

(10) Patent No.: US 9,511,487 B2
(45) Date of Patent: Dec. 6, 2016

(54) INSTALLATION DEVICE FOR A VEHICLE CYLINDER AND INSTALLATION ASSEMBLY HAVING THE SAME

(71) Applicant: Jun-Fan Chen, Taichung (TW)

(72) Inventor: Jun-Fan Chen, Taichung (TW)

( * ) Notice: Subject to any disclaimer, the term of this patent is extended or adjusted under 35 U.S.C. 154(b) by 195 days.

(21) Appl. No.: 14/561,025

(22) Filed: Dec. 4, 2014

(65) Prior Publication Data

US 2016/0144470 A1 May 26, 2016

(30) Foreign Application Priority Data

Nov. 21, 2014 (TW) ............................ 103140437 A

(51) Int. Cl.
*B23P 19/04* (2006.01)
*B25B 27/00* (2006.01)
*B25B 13/50* (2006.01)
*B25B 27/02* (2006.01)

(52) U.S. Cl.
CPC ........... *B25B 27/0035* (2013.01); *B25B 13/50* (2013.01); *B25B 27/023* (2013.01)

(58) Field of Classification Search
USPC ........................................................... 29/240
See application file for complete search history.

(56) References Cited

U.S. PATENT DOCUMENTS 5,003,681 A * 4/1991 Schley .................... B25B 13/48 29/239
6,095,017 A * 8/2000 Long ................... B25B 27/0035 81/176.15
6,755,099 B2 * 6/2004 Huang .................... B25B 13/48 81/176.1
9,376,300 B2 * 6/2016 Yang ................... F16D 65/0043
2010/0147116 A1 * 6/2010 Fenton .................... B25B 13/02 81/120
2012/0216380 A1 * 8/2012 Chen ................... B25B 27/0021 29/267
2012/0266428 A1 * 10/2012 Hodges ................... B25B 5/068 29/239
2013/0263704 A1 * 10/2013 Chen ................... B25B 27/0035 81/177.5
2015/0033914 A1 * 2/2015 Chen ................... B25B 27/0035 81/52
2015/0190912 A1 * 7/2015 Liu ......................... B25B 27/06 29/275
2016/0076608 A1 * 3/2016 Chen ................... F16D 65/0043 29/240

* cited by examiner

*Primary Examiner* — Alvin Grant
(74) *Attorney, Agent, or Firm* — Muncy, Geissler, Olds & Lowe, P.C.

(57) ABSTRACT

An installation device for a vehicle cylinder and an installation assembly having the same are provided. The installation device includes a main body, at least one lateral member and a plurality of swingable abutting members. Each said swingable abutting member disposed between the main body and the lateral member protrudes outside the lateral member and is slidably disposed in one radial sliding slot disposed on the lateral member. Each said swingable abutting member is provided for being assembled to a valve to be installed into the vehicle cylinder. The installation assembly further includes a driving mechanism assembled to the installation device for pushing the valve into the vehicle cylinder.

10 Claims, 7 Drawing Sheets

INSTALLATION DEVICE FOR A VEHICLE CYLINDER AND INSTALLATION ASSEMBLY HAVING THE SAME

BACKGROUND OF THE INVENTION

Field of the Invention

The present invention relates to an installation device, and more particularly to an installation device for a vehicle cylinder and an installation assembly having the same.

Description of the Prior Art

Cylinders for disc brakes are commonly used in lots of transportation, and the hardest and the most critical part of dis/assembling brake cylinders is adjusting and dis/assembling valves.

A brake cylinder adjuster generally includes a pulling plate able to be axially jointed with a brake cylinder, and a driving wrench able to rotate, shift axially and connect to the brake cylinder. A hollow cylindrical positioning shaft protrudes upward at a dead center of a surface of the pulling plate. The outer diameter of positioning shaft corresponds to the inner diameter of the opening end of central valve of the brake cylinder. In this way, the positioning shaft can be inserted precisely into an opening end of the central valve of the brake cylinder, and a reserved positioning column abuts a recess on a side of the brake cylinder so as to dis/assemble the brake cylinder. The prior art is disclosed in TW392552.

However, the size of the positioning shaft of the conventional brake cylinder adjuster is fixed, thus the adjuster can not adjust vehicle cylinder having different-sized valve openings. Besides, the prior art is bigger, heavier and thicker. In addition, the abutting structure is only disposed on a single side of the conventional brake cylinder adjuster, thus the valve having a different number of the notches is unable to be dis/assembled.

The present invention has arisen to mitigate and/or obviate the afore-described disadvantages.

SUMMARY OF THE INVENTION

The primary object of the present invention is to provide a installation device for a vehicle cylinder, able to adjust the distance between abutting columns according to different-sized vehicle cylinder valves. The invention provides a simple structure, light weight, small volume and thin thickness of installation device for a vehicle cylinder, and can be applied to a variety of different-sized vehicle cylinders. In addition, two sides of the device are relatively provided with different numbers of abutting columns so as to be applied for dis/assembling the valves having different numbers of the notches.

To achieve the above object, an installation device for a vehicle cylinder in accordance with the present invention includes a main body, at least one lateral member and a plurality of swingable abutting members. The main body has an assembling portion for a driving mechanism to be assembled thereto. The lateral member is on a side of the main body and rotatably coupled to the main body. A plurality of radial sliding slots is disposed on the lateral member relative to a center of the lateral member. The swingable abutting members are disposed between the main body and the lateral member. Each said swingable abutting member includes a connecting rod and an abutting column. An end of each said connecting rod is pivoted to the main body to form a first pivoting portion. The other end of each said connecting rod is connected to the abutting column. A rotating central portion is defined between the first pivoting portions, each said abutting column protrudes outside of the lateral member and is slidably disposed in one said sliding slot. Each said abutting column is provided for being assembled to a notch of a valve to be abutted of a vehicle cylinder, and each said swingable abutting member swings pivotally about the rotating central portion with the first pivoting portion as a pivoting center.

To achieve the above object, an installation assembly for a vehicle cylinder having the installation device in accordance with present invention further includes a driving mechanism. The driving mechanism includes a rod body, a kit screwed to the rod body and a driving member. An end of the rod body is unrotatably assembled to the assembling portion. The kit is radially formed with a blocking portion, and the blocking portion for being situated between a caliper of the vehicle cylinder and the valve to blockably abut against the caliper. The driving member is laterally connected to the rod body and able to rotate the rod body.

DETAILED DESCRIPTION OF THE PREFERRED EMBODIMENTS

Figure 1:
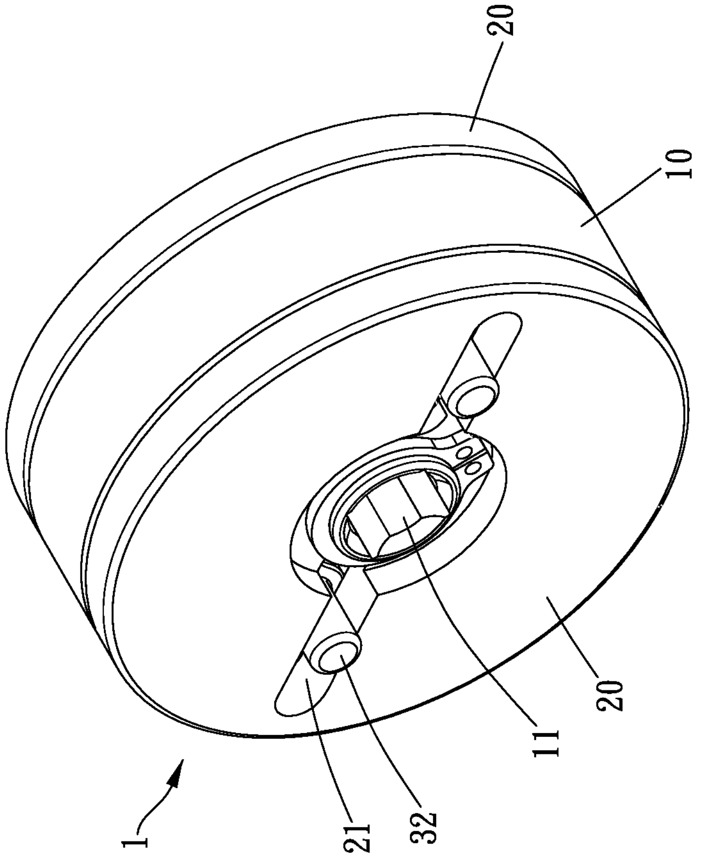
FIG. 1 is a three-dimensional drawing of an installation device for a vehicle cylinder in accordance with a preferable embodiment of the present invention.
Figure 2:
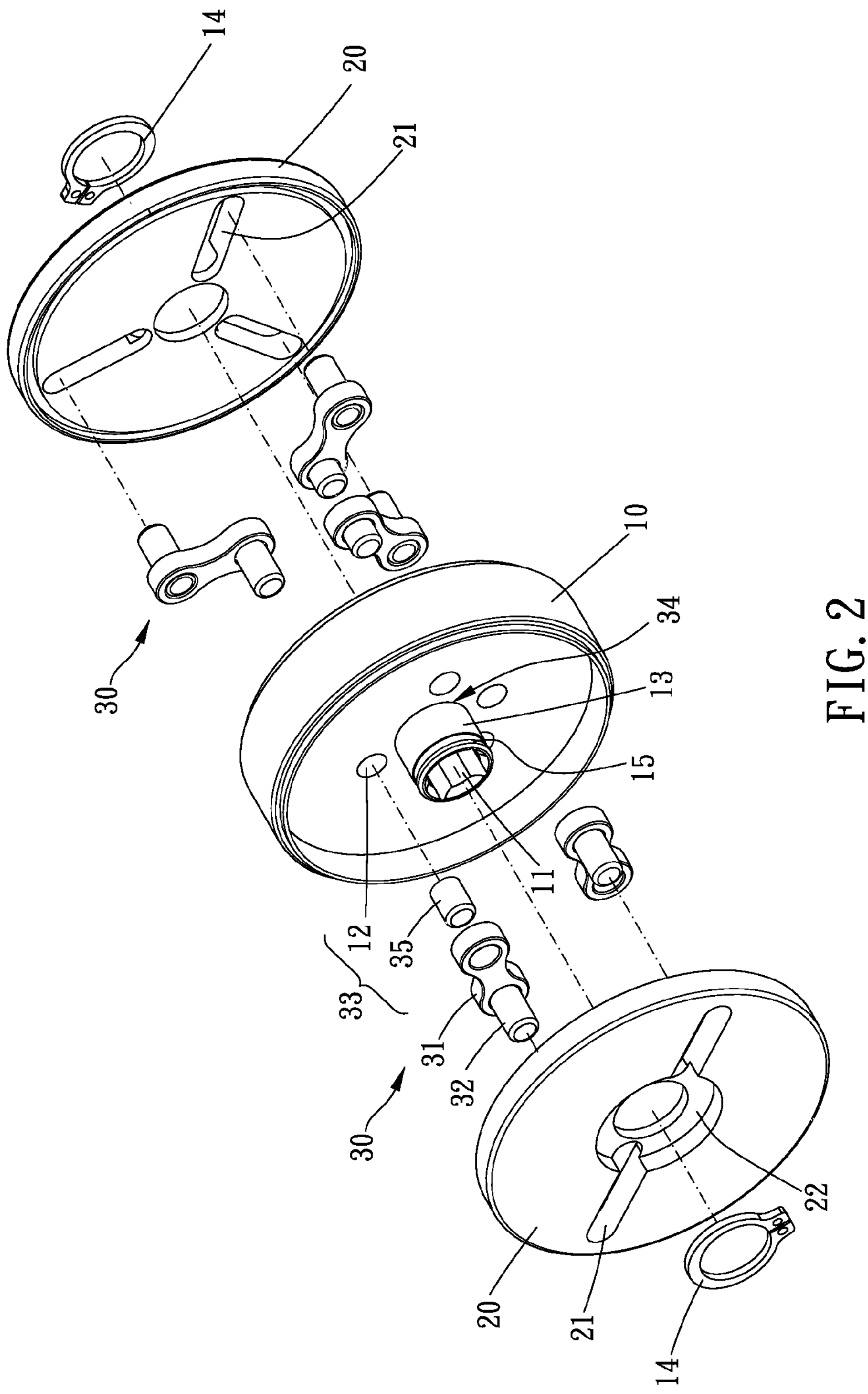
FIG. 2 is a breakdown drawing of the installation device for a vehicle cylinder in accordance with the preferable embodiment of the present invention.
Figure 3:
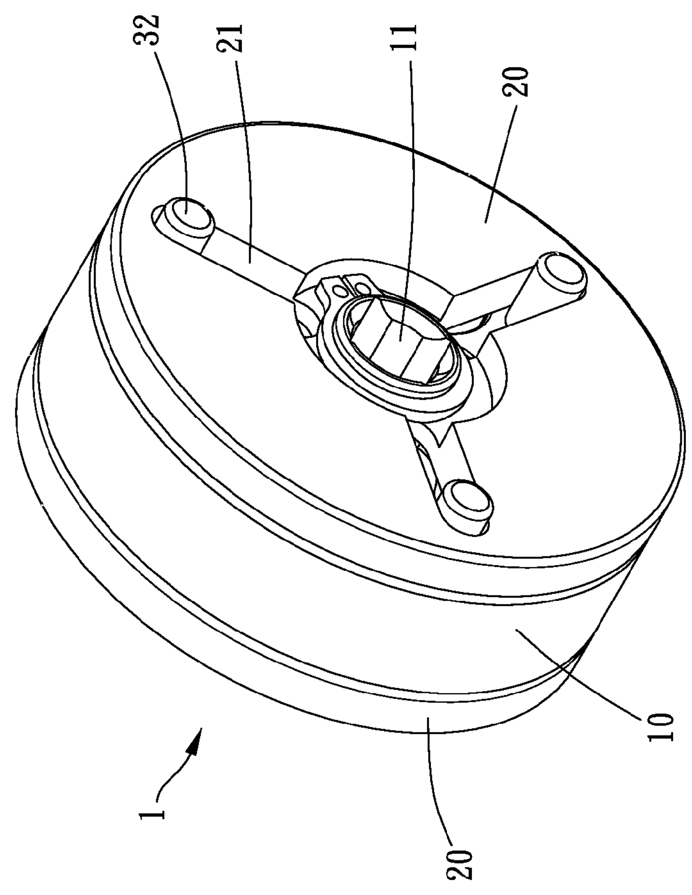
FIG. 3 is an another three-dimensional drawing of the installation device for a vehicle cylinder in accordance with the preferable embodiment of the present invention.
Figure 5:
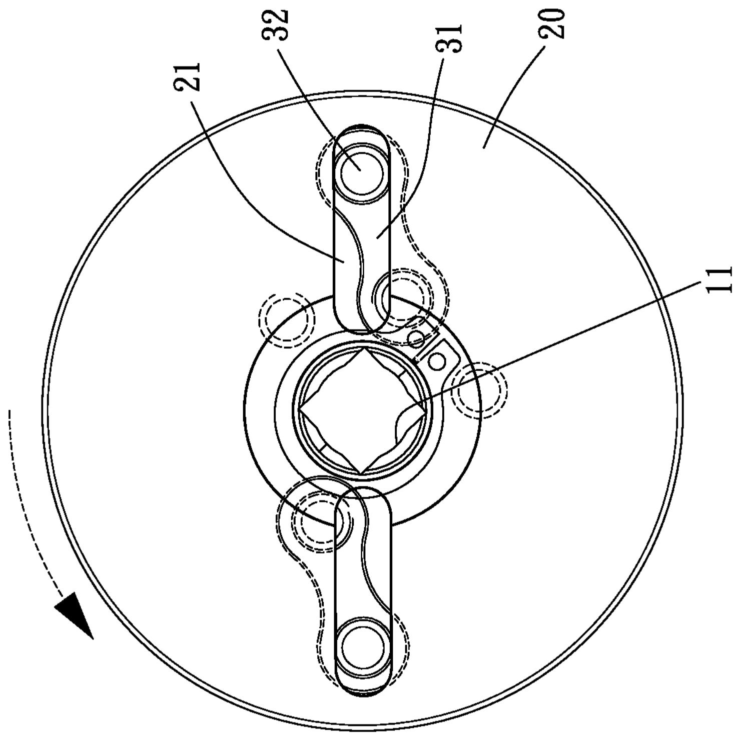
FIGS. 4 and 5 are perspective drawings of the installation device for a vehicle cylinder in accordance with the preferable embodiment of the present invention in operation.
Figure 4:
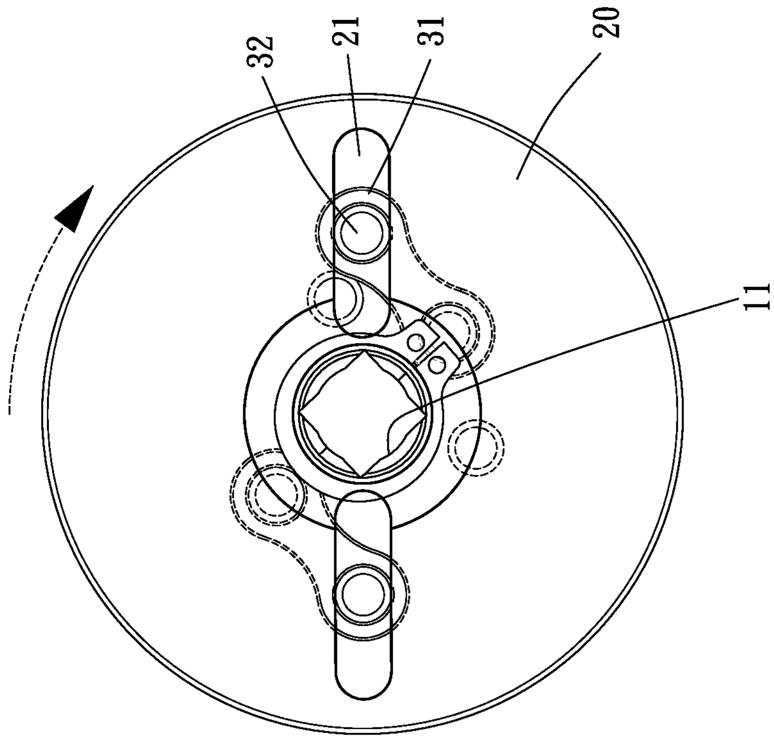

The present invention will be clearer from the following description when viewed together with the accompanying drawings, which show, for purpose of illustrations only, the preferred embodiment in accordance with the present invention.

Referring to FIGS. 1-5, an installation device for a vehicle cylinder 1 in accordance with a preferred embodiment of the present invention includes a main body 10, at least one lateral member 20 and a plurality of swingable abutting members 30.

The main body 10 has an assembling portion 11 for a driving mechanism to be assembled thereto. For example, the assembling portion 11 can be a polygonal cavity or through hole, or even a polygonal column.

At least one said lateral member 20 is on a side of the main body 10 and rotatably coupled to the main body 10. A plurality of radial sliding slots 21 are disposed on the lateral member 20 relative to a center of the lateral member 20, wherein the radial sliding slots 21 are equiangularly arranged on the lateral member 20.

The swingable abutting members 30 are disposed between the main body 10 and the lateral member 20. Each said swingable abutting member 30 includes a connecting rod 31 and an abutting column 32. An end of each said connecting rod 31 is pivoted to the main body 10 to form a first pivoting portion 33, and the other end of each said connecting rod 31 is connected to the abutting column 32. A rotating central portion 34 is defined between the first pivoting portions 33. Each said abutting column 32 protrudes outside of the lateral member 20 and is slidably disposed in one said sliding slot 21. Each said abutting column 32 is provided for being assembled to a notch of a valve to be installed into the vehicle cylinder, and each said swingable abutting member 30 is swingable around the rotating central portion 34 with the first pivoting portion 33 as a pivoting center. The swingable abutting member 30 can be integrally formed.

In this embodiment, each of two opposite sides of the main body 10 is coupled with one said lateral member 20. A number of the swingable abutting members 30 disposed on one of the two opposite sides of the main body 10 is different from a number of the swingable abutting members 30 disposed on the other of the two opposite sides of the main body (2 and 3, relatively), that is, the invention can be applied for dis/assembling the valves having different numbers of the notches. Specifically, the main body 10 has a plurality of pivoting holes 12 thereon, and each said swingable abutting member 30 has a pivoting column 35 disposed in each said pivoting hole 12. In other embodiments, the main body 10 can have pivoting columns thereon, and each said swingable abutting member has a pivoting hole. Preferably, the lateral member 20 is provided with an annular recess 22, the main body 10 is provided with a protruding column 13 penetrating the annular recess 22, the protruding column 13 is provided with the assembling portion 11, and a connecting portion is assembled to the protruding column 13 and blockably disposed in the annular recess so as to couple the main body 10 with the lateral member 20. Therefore, the overall thickness gets thin, and the assembling area can be protected. For example, the connecting portion includes a snap ring 14 radially disposed on a clamping groove 15 around one end of the protruding column 13, but is not limited thereto. After assembling, the installation device for a vehicle cylinder 1 is overall similar to a disc shape.

Figure 6:
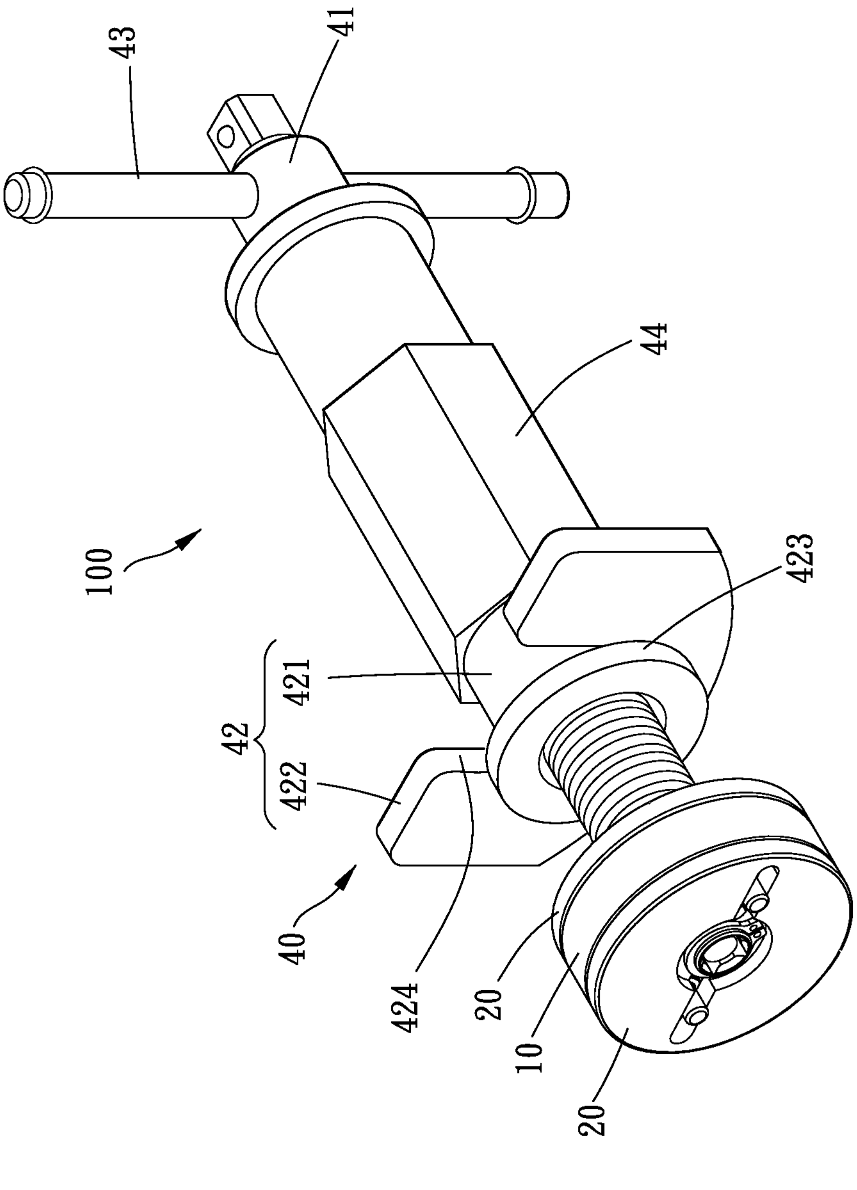
FIG. 6 is a three-dimensional drawing of an installation assembly for a vehicle cylinder in accordance with a preferable embodiment of the present invention.
Figure 7:
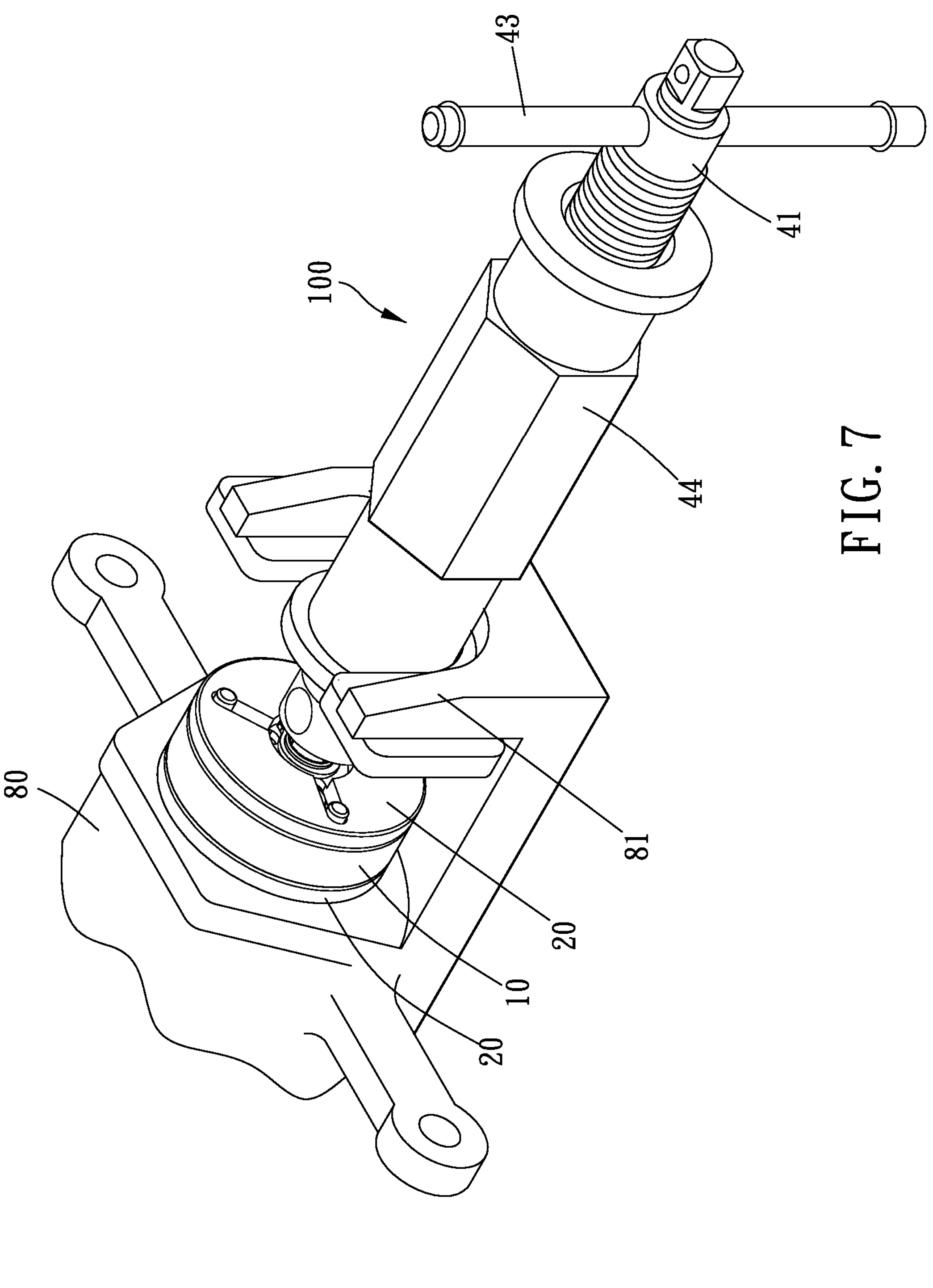
FIGS. 7 and 8 are other perspective drawings of the installation assembly for a vehicle cylinder in accordance with another preferable embodiment of the present invention in operation.
Figure 8:
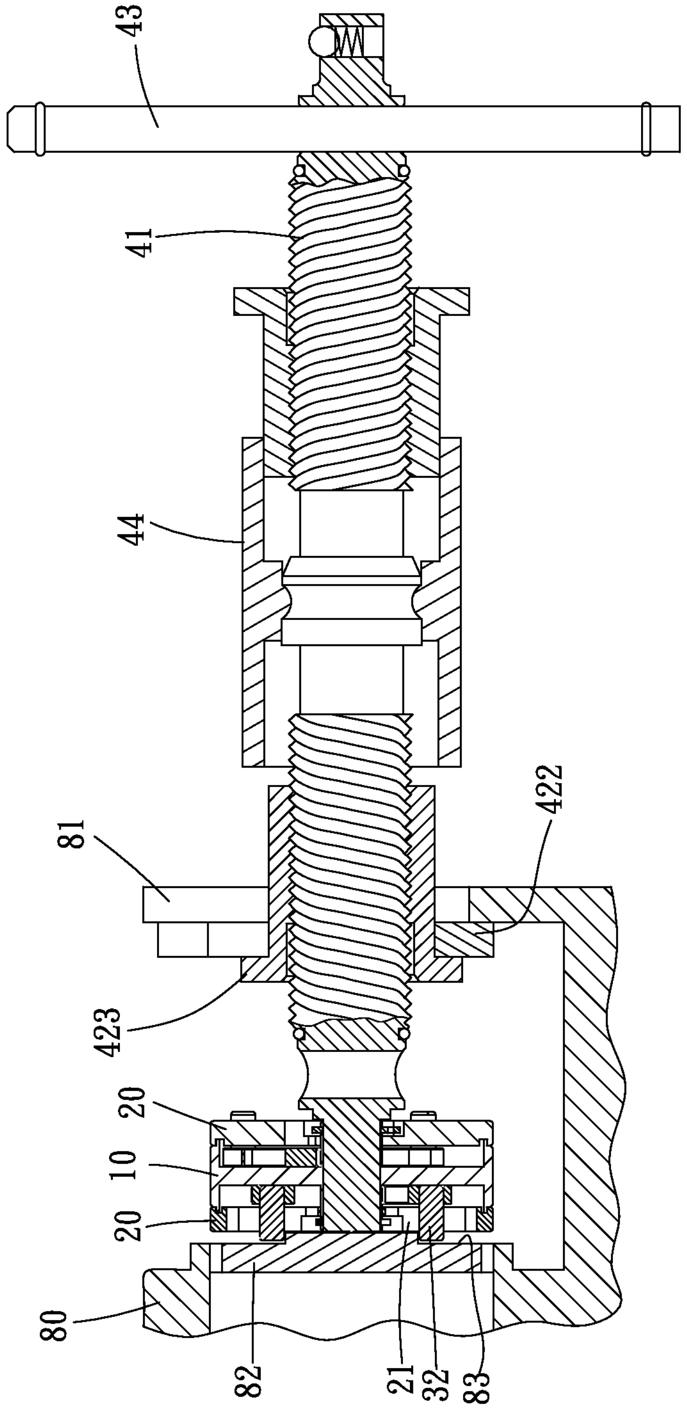

Referring to FIGS. 6-8, in the present embodiment, the invention further provides an installation assembly for a vehicle cylinder 100 having the installation device for a vehicle cylinder 1, and further including a driving mechanism 40. The driving mechanism 40 includes a rod body 41, a kit 42 screwed to the rod body 41 and a driving member 43. An end of the rod body 41 is unrotatably assembled to the assembling portion 11. The kit 42 is radially formed with a blocking portion. The blocking portion is for being situated between a caliper 81 of the vehicle cylinder 80 and the valve 82 to blockably abut against the caliper 81, and the driving member 43 (such as a rod) is laterally connected to the rod body 41 and able to rotate the rod body 41.

In the present embodiment, the driving mechanism 40 further includes a sleeve 44 rotatably disposed around the rod body 41. The kit 42 includes a tubular body 421 screwed to the rod body 41 and a blocking plate 422. The tubular body 421 is radially formed with a blocking flange 423 and penetrates the blocking plate 422. The blocking flange 423 is blockably situated at a side of the blocking plate facing the installation device, and the blocking plate 422 is for being situated between the caliper 81 of the vehicle cylinder 80 and the valve 82 to blockably abut against the caliper 81. In other embodiments, each opposite end of the rod body 41 can connect with one said kit 42 so as to apply to both vehicle cylinders at the same time.

In use, referring to FIGS. 7-8, the blocking plate 422 blockably abuts against a side of the caliper 81. The tubular body 421 screwed to the rod body 41 is placed at a recess 424 of the blocking plate 422. Via rotating the main body 10 relative to the lateral member 20, the distance between the abutting columns 32 can be adjusted, so that each abutting column 32 of the installation device 1 connecting to the rod body 41 can be inserted precisely into a notch 83 of the valve 82 of the vehicle cylinder 80. Because the blocking plate 422 abuts against a side of the caliper 81, the valve 82 to be installed can be pushed into the vehicle cylinder 80 via rotating the driving member 43 to drive the rod body 41 moving forward relative to the tubular 421.

As a conclusion, an installation device for a vehicle cylinder in accordance with the present invention can adjust the distance between abutting columns via rotating the main body relative to the lateral member to be applied for dis/assembling different-sized vehicle cylinder valves. The invention provides a simple structure, light weight, small volume and thin thickness of installation device, and can be applied to a variety of different-sized vehicle cylinders.

In addition, a number of the swingable abutting members disposed on one of the two opposite sides of the main body is different from a number of the swingable abutting members disposed on the other of the two opposite sides of the main body, thus the invention can be used to dis/assemble the valves having different numbers of the notches.

While we have shown and described various embodiments in accordance with the present invention, it should be clear to those skilled in the art that further embodiments may be made without departing from the scope of the present invention.

What is claimed is:

1. An installation device for a vehicle cylinder, including:
- a main body, having an assembling portion for a driving mechanism to be assembled thereto;
- at least one lateral member, being on a side of the main body and rotatably coupled to the main body, a plurality of radial sliding slots disposed on the lateral member relative to a center of the lateral member;
- a plurality of swingable abutting members, disposed between the main body and the lateral member, each said swingable abutting member including a connecting rod and an abutting column, an end of each said connecting rod pivoted to the main body to form a first pivoting portion, the other end of each said connecting rod connected to the abutting column, a rotating central portion defined between the first pivoting portions, each said abutting column protruding outside the lateral member and slidably disposed in one said sliding slot, each said abutting column provided for being assembled to a notch of a valve to be installed into the vehicle cylinder, and each said swingable abutting member being swingable around the rotating central portion with the first pivoting portion as a pivoting center.

2. The installation device as claimed in claim 1, wherein the radial sliding slots are equiangularly arranged on the lateral member.

3. The installation device as claimed in claim 1, wherein the main body has a plurality of pivoting holes thereon, and each said swingable abutting member has a pivoting column disposed in each said pivoting hole.

4. The installation device as claimed in claim 1, wherein the assembling portion is a polygonal cavity or a polygonal column.

5. The installation device as claimed in claim 1, wherein the lateral member is provided with an annular recess, the main body is provided with a protruding column penetrating the annular recess, the protruding column is provided with the assembling portion, and a connecting portion is assembled to the protruding column and blockably disposed in the annular recess so as to couple the main body with the lateral member.

6. The installation device as claimed in claim 1, wherein each of two opposite sides of the main body is coupled with one said lateral member.

7. The installation device as claimed in claim 6, wherein a number of the swingable abutting members disposed on one of the two opposite sides of the main body is different from a number of the swingable abutting members disposed on the other of the two opposite sides of the main body.

8. An installation assembly for a vehicle cylinder, comprising the installation device of claim 1, and further including:

a driving mechanism, including a rod body, a kit screwed to the rod body and a driving member, an end of the rod body unrotatably assembled to the assembling portion, the kit radially formed with a blocking portion, the blocking portion for being situated between a caliper of the vehicle cylinder and the valve to blockably abut against the caliper, and the driving member laterally connected to the rod body and able to rotate the rod body.

9. An installation assembly as claimed in claim 8, wherein the driving mechanism further includes a sleeve rotatably disposed around the rod body.

10. An installation assembly as claimed in claim 8, wherein the kit includes a tubular body screwed to the rod body and a blocking plate, the tubular body is radially formed with a blocking flange and penetrates the blocking plate, the blocking flange is blockably situated at a side of the blocking plate facing the installation device, and the blocking plate is for being situated between the caliper of the vehicle cylinder and the valve to blockably abut against the caliper.

* * * * *